(12) United States Patent
Nakamura et al.

(10) Patent No.: US 7,404,029 B2
(45) Date of Patent: Jul. 22, 2008

(54) ACCESSING DEVICE

(75) Inventors: Tsutomu Nakamura, Kanagawa (JP); Yamagata Hiroshi, Kanagawa (JP)

(73) Assignee: Eastman Kodak Company, Rochester, NY (US)

( * ) Notice: Subject to any disclaimer, the term of this patent is extended or adjusted under 35 U.S.C. 154(b) by 342 days.

(21) Appl. No.: 11/366,944

(22) Filed: Mar. 2, 2006

(65) Prior Publication Data

US 2007/0073962 A1   Mar. 29, 2007

(30) Foreign Application Priority Data

Sep. 29, 2005   (JP) ............................. 2005-285404

(51) Int. Cl.
*G06F 12/00* (2006.01)
*G06F 13/00* (2006.01)
*G06F 13/28* (2006.01)
*G06F 9/26* (2006.01)
*G06F 9/34* (2006.01)
*G11C 11/34* (2006.01)
*G11C 16/04* (2006.01)

(52) U.S. Cl. ....................... 711/103; 711/154; 711/163; 711/202; 365/185.02; 365/185.17

(58) Field of Classification Search ................... 711/103
See application file for complete search history.

(56) References Cited

U.S. PATENT DOCUMENTS

| | | | | |
|---|---|---|---|---|
| 6,570,785 | B1 * | 5/2003 | Mangan et al. | 365/185.02 |
| 6,996,003 | B2 * | 2/2006 | Li et al. | 365/185.02 |
| 7,177,191 | B2 * | 2/2007 | Fasoli et al. | 365/185.17 |
| 7,295,473 | B2 * | 11/2007 | Fong et al. | 365/185.17 |
| 2005/0210184 | A1 * | 9/2005 | Chen et al. | 711/103 |

FOREIGN PATENT DOCUMENTS

| | | |
|---|---|---|
| JP | 7287604 | 10/1995 |
| JP | 11110984 | 4/1999 |
| JP | 2003346106 | 12/2003 |

* cited by examiner

*Primary Examiner*—Donald Sparks
*Assistant Examiner*—Ryan Bertram
(74) *Attorney, Agent, or Firm*—Pamela R. Crocker (57) ABSTRACT

To provide an accessing device which allows reliable protection of important data. A memory accessing device has a file system device which manages a logical memory space and a driver device which maintains a correlation information between the logical memory space and a physical memory space and which physically accesses a flash memory based on the correlation information. The flash memory is physically divided into a plurality of strings. The file system device manages the memory space by dividing the memory space into a plurality of partitions each of which is set to one of RO and RW. The driver device specifies a permission type to write the data in a string by correlating each string to a single logical partition.

7 Claims, 7 Drawing Sheets

| PARTITION NUMBER | RECORD DATA TYPE | WRITE PERMISSION TYPE | STRING NUMBER | MEMORY NUMBER |
|---|---|---|---|---|
| 1 | MEMORY MANAGEMENT DATA | RW | 1 | |
| 2 | CALIBRATION DATA | RO | 2, 3 | |
| 3 | FW DATA | RO | 4~6 | |
| 4 | CAMERA SETTING DATA | RW | 7 | 1 |
| 5 | USER DATA IMAGE CACHE DATA | RW | 8~12 | |
| 6 | USER IMAGE DATA | RW | 13~32 | |
| 7 | USER IMAGE DATA | RW | 1~32 | 2 |

| PARTITION NUMBER | RECORD DATA TYPE | WRITE PERMISSION TYPE | STRING NUMBER | MEMORY NUMBER |
|---|---|---|---|---|
| 1 | MEMORY MANAGEMENT DATA | RW | 1 | 1 |
| 2 | CALIBRATION DATA | RO | 2, 3 | |
| 3 | FW DATA | RO | 4~6 | |
| 4 | CAMERA SETTING DATA | RW | 7 | |
| 5 | USER DATA IMAGE CACHE DATA | RW | 8~12 | |
| 6 | USER IMAGE DATA | RW | 13~32 | |
| 7 | USER IMAGE DATA | RW | 1~32 | 2 |

Fig. 3

| STRING NUMBER | PHYSICAL ADDRESS | LOGICAL ADDRESS | PREDICTED MAXIMUM NUMBER OF INVALID BLOCKS | ADDRESS OFFSET |
|---|---|---|---|---|
| 1 | 0~255 | 0~223 | 32 | 0 |
| 2 | 256~511 | 224~447 | 32 | 32 |
| 3 | 512~767 | 448~671 | 32 | 64 |
| . | . | . | . | . |
| . | . | . | . | . |
| . | . | . | . | . |

Fig. 4

| STRING NUMBER | ADDRESS OFFSET | PHYSICAL ADDRESS | DELETED STATE | LOGICAL ADDRESS |
|---|---|---|---|---|
| 1 | 0 | . . . | | . . . |
| | | 254 | | 220 |
| | | 255 | | 221 |
| 2 | 32 | 256 | | 224 |
| | | 257 | | 225 |
| | | 258 | | 301 |
| | | 259 | | 302 |
| | | 260 | | UNRECORDED |
| | | 261 | | 305 |
| | | . . . | | . . . |
| | | 509 | | 350 |
| | | 510 | | 351 |
| | | 511 | | 352 |
| 3 | 64 | 512 | | 448 |
| | | 513 | | 449 |
| | | . . . | | . . . |

Fig. 5

| STRING NUMBER | ADDRESS OFFSET | PHYSICAL ADDRESS | DELETED STATE | LOGICAL ADDRESS |
|---|---|---|---|---|
| 1 | 0 | . | | . |
| | | . | | . |
| | | . | | . |
| | | 254 | | 220 |
| | | 255 | | 221 |
| 2 | 32 | 256 | | 224 |
| | | 257 | | 225 |
| | | 258 | | 301 |
| | | 259 | | 302 |
| | | 260 | | 477 |
| | | 261 | | 305 |
| | | . | | . |
| | | . | | . |
| | | . | | . |
| | | 509 | | 350 |
| | | 510 | | 351 |
| | | 511 | QUASI-DELETED | 352 |
| 3 | 64 | 512 | | 448 |
| | | 513 | | 449 |
| | | . | | . |
| | | . | | . |
| | | . | | . |

Fig. 6

| STRING NUMBER | ADDRESS OFFSET | PHYSICAL ADDRESS | DELETED STATE | LOGICAL ADDRESS |
|---|---|---|---|---|
| 1 | 0 | . | | . |
| | | . | | . |
| | | . | | . |
| | | 254 | | 220 |
| | | 255 | | 221 |
| 2 | 32 | 256 | | 224 |
| | | 257 | | 225 |
| | | 258 | | 301 |
| | | 259 | | 302 |
| | | 260 | | 477 |
| | | 261 | | 305 |
| | | . | | . |
| | | . | | . |
| | | . | | . |
| | | 509 | | 350 |
| | | 510 | | 351 |
| | | 511 | | UNRECORDED |
| 3 | 64 | 512 | | 448 |
| | | 513 | | 449 |
| | | . | | . |
| | | . | | . |
| | | . | | . |

Fig. 7

ACCESSING DEVICE

FIELD OF INVENTION

The present invention generally relates to an accessing device which controls reading and writing operations of data from and to a flash memory which is divided into a plurality of strings having physically independent charge controls.

BACKGROUND OF THE INVENTION

A flash memory has advantages such as the ability to hold data after powering down, and its small size. Therefore, the flash memory has conventionally found many applications as recording media for a variety of equipment, such as a digital camera. Conventional methods can be used to control reading and writing data from and to such a flash memory. For example, techniques described in Japanese Patent Laid-Open Publication No. 2003-346106 and Japanese Patent Laid-Open Publication No. Hei 11-110984 may be used.

While the flash memory has advantages as described above, it is known that it may suffer from data corruption due to a phenomenon known as drain disturb. The drain disturb may occur when a difference in the number of rewrites of data increases between blocks which physically constitute the flash memory. Such data corruption caused by the drain disturb may degrade reliability of the flash memory, and in some cases, have adverse effects on control of the equipment which utilizes the flash memory as its recording media.

A technique for preventing data from being corrupted beyond a certain number of data writes to a non-volatile memory is disclosed in Japanese Patent Laid-Open Publication No. Hei 7-287604. According to the Japanese Patent Laid-Open Publication No. Hei 7-287604, the number of writes to a memory is stored in the memory and the stored number is referenced before writing data. In this way, data corruption beyond a certain number of data writes may be reduced.

In the Japanese Patent Laid-Open Publication No. Hei 7-287604, however, data recording may fail when a certain number of data writes is exceeded, because writing of data is disabled. In other words, the technique described in the Japanese Patent Laid-Open Publication No. Hei 7-287604 may cause a memory to be unavailable, and consequently may hamper the proper operation of the equipment which is provided with the memory.

In addition, each of a plurality of data items stored in a single memory has importance which is not equal for each data item, and which may often vary depending on the type of data. The techniques described in the Japanese Patent Laid-Open Publication No. 2003-346106, No. Hei 11-110984, and No. Hei 7-287604 do not address such a difference in importance. Therefore, these techniques do not necessarily provide data protection depending on importance of each data item, and specifically do not provide more reliable protection of important data.

SUMMARY OF THE INVENTION

An accessing device according to the present invention relates to an accessing device which controls reading and writing operations of data from and to a flash memory which is divided into a plurality of strings having physically independent charge controls. The accessing device of the invention includes a high-level management device and a low-level management device. The high-level management device manages a logical memory space by dividing the logical memory space into a plurality of partitions in which a write permission type is set at read-only or rewritable. The low-level management device maintains a correlation information between a physical memory space configuration and a logical memory space configuration, and reads and writes data from and to a flash memory based on the correlation information when the high-level management device instructs reading or writing of data from or to the flash memory. The low-level management device specifies a permission type to write the data in a string by mapping one or multiple strings to a single partition.

In a preferred embodiment, as a correlation information between the strings and the partitions, the low-level management device maintains a correlation information between a physical address assigned to each of a plurality of blocks which physically constitute each string and a logical address assigned to each of a plurality of clusters which logically constitute each partition.

In another preferred embodiment, if a predicted maximum number of invalid blocks included in each string is known, a plurality of logical addresses are associated with a plurality of physical addresses assigned to each string up to the difference between the number of physical blocks constituting the string and the predicted maximum number of invalid blocks included in the string.

In another preferred embodiment, when rewritable data is recorded in the flash memory, the low-level management device sequentially searches for an unrecorded block, in which data has not physically been recorded, in a string corresponding to a logical address where the high-level management device instructs recording of data, from an initial search position determined based on the specified logical address, and the low-level management device records the data in a first discovered unrecorded block. In this case, if an unrecorded block is not discovered by the end of the string in a search of the unrecorded block, it is preferred that the low-level management device sequentially searches for the unrecorded block from the start of the string. Additionally, when the high-level management device instructs deleting of data, it is preferred that the low-level management device puts a block corresponding to the specified logical address in a quasi-deleted state in which the data is logically deleted and is not physically deleted, and if an unrecorded block is not discovered in search for the unrecorded block, physically deletes the data in the block in the quasi-deleted state to form an unrecorded block.

According to the present invention, the write permission type of data physically stored in a string can be unified. This can avoid coexistence of read-only data and rewritable data in a string, and thus prevent corruption of the read-only data caused by the drain disturb. Consequently, important data can be more reliably protected.

It is an advantage of the present invention to provide an accessing device which provides more reliable protection of important data.

DETAILED DESCRIPTION OF THE INVENTION

Figure 1:
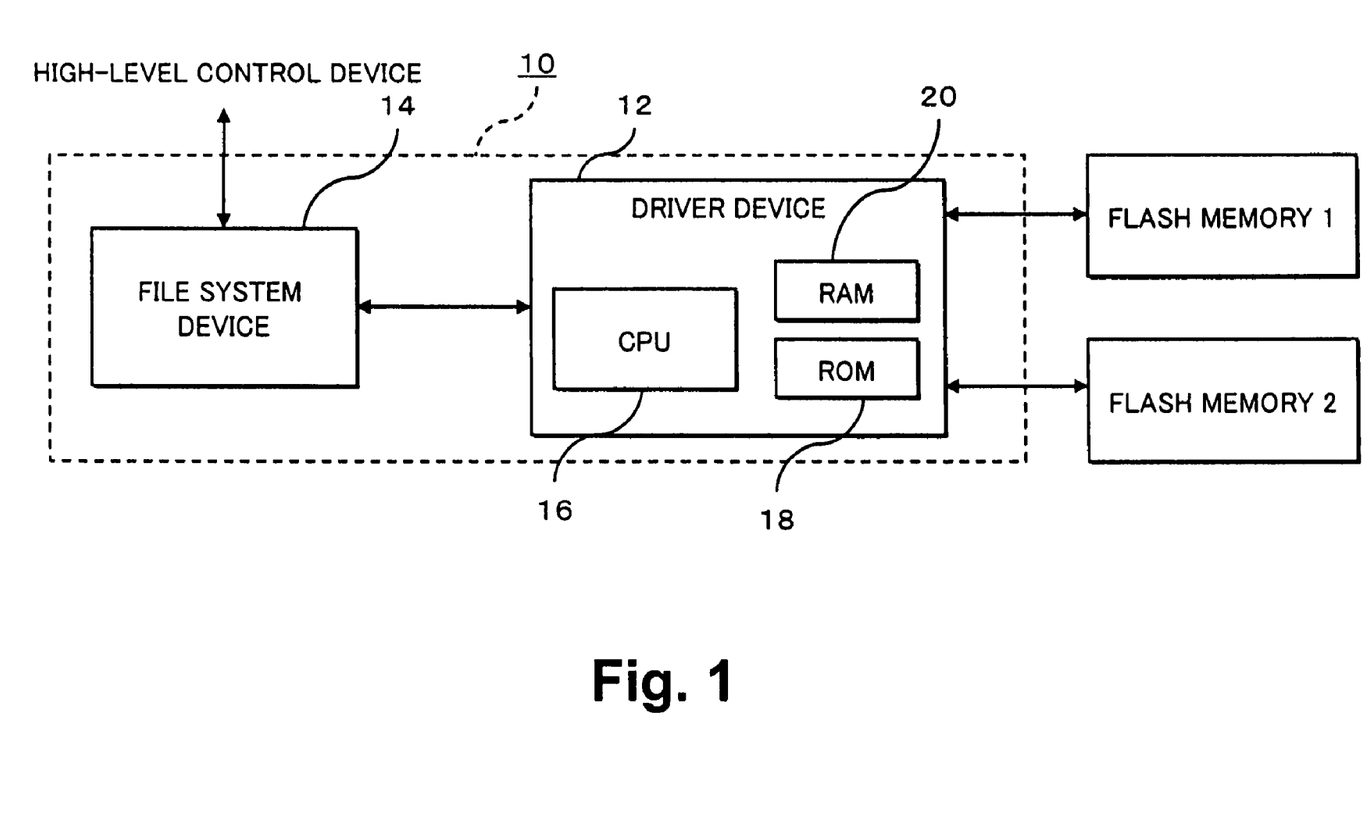
FIG. 1 is a block diagram showing a configuration of a memory-accessing device according to an embodiment of the invention.

Embodiments of the invention will now be described with reference to the drawings. FIG. 1 is a block diagram showing a configuration of a memory-accessing device 10 according to an embodiment of the invention. The memory-accessing device 10, which is mounted on a digital camera, accesses a flash memory to read and write data from and to it as appropriate in response to an instruction from a high-level control device provided within the digital camera. However, this may of course be applied to other electronic devices which use the flash memory as their recording media, such as an electronic audio device and a cellular phone. In the embodiment, the memory-accessing device 10 is connected to two flash memories through a bus, and controls reading and writing operations of data from and to both the flash memories. However, reading and writing operations of data may of course be controlled from and to more or less flash memories.

The memory-accessing device 10 is divided into two devices: a file system device 14 which functions as a high-level management device, and a driver device 12 which functions as a low-level management device. The file system device 14 manages a logical memory space and maintains an address of each file as a logical address. In the embodiment, the file system device 14 divides the memory space into a plurality of partitions, and sets a write permission type to each partition. Either "read-only" or "rewritable" is set as a write permission type. The division into the partitions and the setting of the write permission type will be described in detail below. When instructed by the high-level control device to access a predetermined file, the file system device 14 notifies the logical address of the file to the driver device 12.

The driver device 12 maintains a correlation information between a physical memory space configuration and a logical memory space configuration, and based on the correlation information, writes data to a flash memory at a predetermined location and reads data recorded at the predetermined location. The driver device 12 consists of central processing unit (CPU) 16 as well as random access memory (RAM) 20 and read only memory (ROM) 18. A program for driving the driver device 12 is recorded in the ROM 18. The CPU 16 invokes the program stored in the ROM 18 to read and write data depending on an instruction from the file system device 14. The RAM 20 maintains various data required to read and write data, specifically a correlation information table between a physical address and a logical address of a flash memory to be controlled, a correlation information table between a string number and an address offset described below, and the like. The CPU 16 refers to the various correlation information tables stored in the RAM 20 as appropriate, and updates the tables as required. How data is specifically read and written, and contents of the various correlation information table will be described in detail below.

Figure 2:
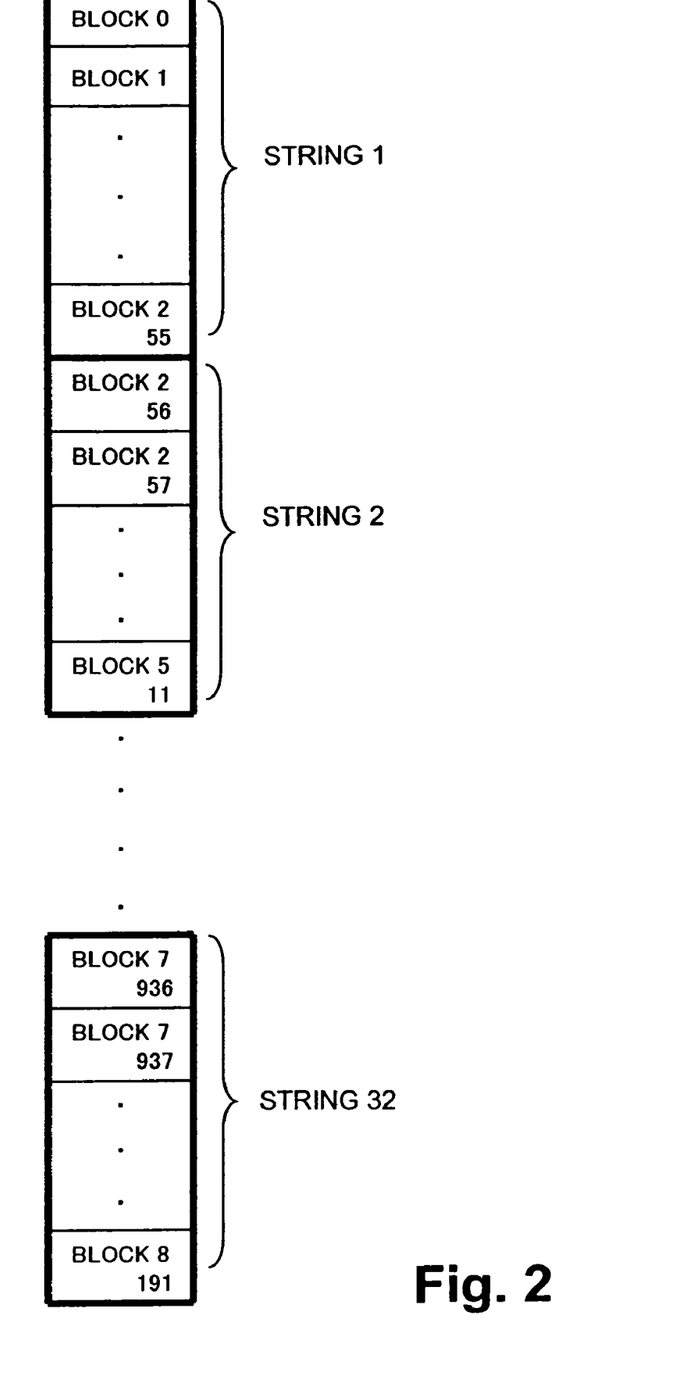
FIG. 2 shows a physical configuration of a flash memory.

A physical configuration, or a physical memory space configuration, of a flash memory to be controlled by the memory-accessing device 10 will now be described with reference to FIG. 2. FIG. 2 schematically shows a physical configuration of a single flash memory.

Typically, a flash memory is previously physically divided into a plurality of, specifically 32, strings. Each string has a physically independent charge control. The plurality of strings have string numbers physically assigned from the start in ascending order. A plurality of, specifically 256, blocks are also provided in each string. The block is a unit corresponding to a cluster in FAT system, and records data of approximately 16 K bytes. The blocks have physical addresses physically assigned from the start in ascending order.

In a flash memory, the large difference in the number of rewrites of data between adjacent blocks may cause charge irregularity, resulting in data corruption. Such a phenomenon is known as drain disturb, and contributes to degradation in reliability of the flash memory. The drain disturb may occur between blocks in the same string. For example, if the difference in the number of rewrites of data between block 256 and block 257 in FIG. 2 increases, data stored in the block with less rewrites may be corrupted.

On the other hand, the difference in the number of rewrites of data between different strings does not cause the drain disturb. As previously discussed, because each string has a charge control physically independent of each other, the string is not affected by charge irregularity of a block in an adjacent string. For example, block 255 and block 256 are adjacent to each other in FIG. 2, while these two blocks are present in different strings and have a physically independent charge control. Therefore, even if the difference in the number of rewrites of data between the block 255 and the block 256 increases, the drain disturb phenomenon, and thus data corruption, will not occur.

An example of a correlation information between a logical memory space configuration and a physical memory space configuration according to the invention will now be described with reference to FIG. 3. Here, an example of a memory space configuration used in a digital camera is described. The memory space configuration described below is illustrative only, and may vary as required. Three left columns in FIG. 3, i.e. partition number, record data type, and write permission type, show the logical memory space configuration managed by the file system device 14. Two right columns, i.e. memory number and string number, show the physical memory space configuration.

Figure 3:
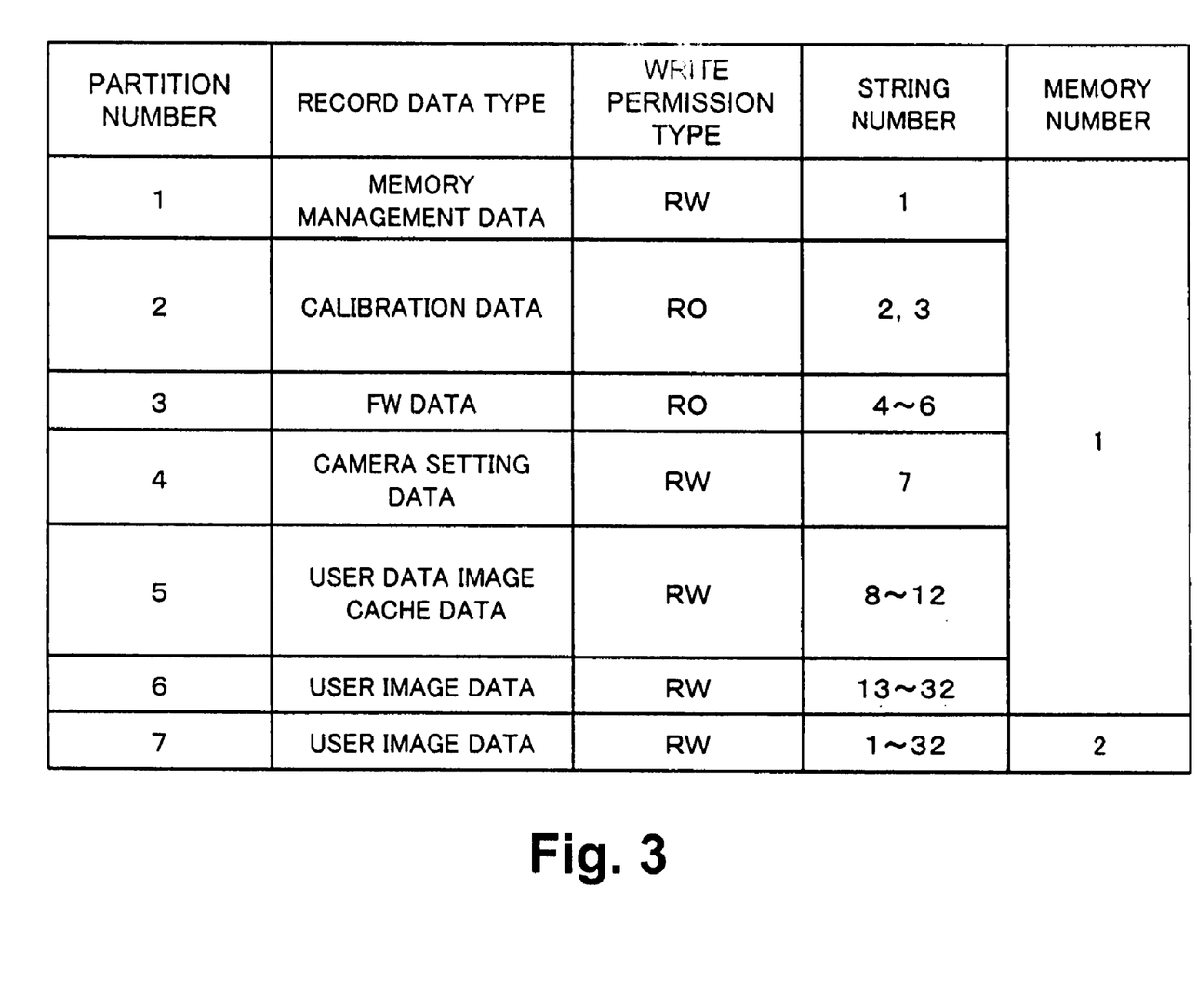
FIG. 3 is a table showing a correlation information between a logical memory space configuration and a physical memory space configuration.

As can be seen in FIG. 3, in the embodiment, the logical memory space is divided into 7 partitions. The respective record data type and write permission type are set in each partition. The write permission type has two types, rewritable (RW) and read-only (RO). RW indicates that data can be rewritten as appropriate, and RO indicates that data cannot be rewritten. Typically, RO is set to a partition which does not easily allow a user to re-create data and which maintains data deeply involved in basic operation of the equipment. In the embodiment, RO is set to the partitions 2 and 3, which store calibration data and firmware (FW) data respectively. The calibration data is used to adjust color in an image handled in a digital camera. The calibration data is created and recorded by the manufacturer before shipment, and is not easily re-created by a user. If the calibration data corrupts, color in the image handled in the digital camera can no longer be adjusted so that the proper operation of the digital camera is hampered. Therefore, RO is set to the partition 2 which maintains the calibration data.

FW data is used for basic control of a digital camera. The FW data is also created and recorded by the manufacturer before shipment as with the calibration data, and is not easily re-created by a user. If the FW data becomes corrupted, the basic operation of the digital camera will be hampered. Therefore, RO is set for the partition which maintains the FW data.

On the other hand, RW is set to a partition for recording data which needs to be rewritten as appropriate. In the embodiment, RW is set to the partitions 1, 4, 5, 6 and 7 which record memory management data, camera setting data, user data and image cache data, and user image data, respectively.

The memory management data is information used for managing the flash memory 1 and 2. For example, the memory management data includes the number, physical addresses, and the like of damaged blocks, or invalid blocks. Because the memory management data is rewritable data to be rewritten as appropriate by the driver device, RW is set to the partition 1 which records the memory management data.

The camera setting data relates to various settings for the digital camera. Because the data is altered as appropriate by the user, RW is also set to the partition 7 which records the data.

Among user-created and user-recorded data, the user data is data other than image data. The image cache data is image data temporarily stored during imaging or image processing. Therefore, RW is also set to the partition 5 which maintains the user data and the image cache data.

The user image data is data of image imaged by the digital camera and which is to be recorded by the instruction of the user. The image data to be recorded by the instruction of the user is recorded and saved in either of the partitions 6 and 7. RW is also set for the partitions 6 and 7 which record the user image data.

Each partition above is mapped to respective strings which are components of the physical memory space. As shown in FIG. 3, a single partition has one or more strings mapped thereto: for example, the partition 1 is mapped to the string 1, the partition 2 to the strings 2 and 3, and the partition 3 to the strings 4 to 6. In contrast, a single string has a single partition mapped thereto. In other words, a partition is delimited using a string as a unit. Consequently, the write permission type of data recorded in a string will be unified.

The driver device then physically records data in a string corresponding to each partition where the data is logically recorded. At this time, if a single string has a single partition mapped thereto, the write permission type of data recorded in the string will be limited to the write permission type set to the corresponding single partition. Consequently, only RO data will be recorded in the string which should store RO data, and only RW data will be recorded in the string which should store RW data.

Such a configuration may prevent RO data corruption caused by the drain disturb as previously discussed. RO data is such that it will not be rewritten. Therefore, avoiding recording of RW data in a string where RO data is stored will also avoid the difference in the number of rewrites relative to an adjacent block, and therefore data corruption caused by the drain disturb. Consequently, RO data can be reliably protected. The read-only data should be protected because much of the read-only data cannot be re-created and affects the basic operation of a digital camera.

On the other hand, RW date is stored in a string corresponding to the RW partition. In the string, therefore, data corruption caused by the drain disturb may occur. However, normally RW data can often be re-created by the user, or does not affect the basic operation of a digital camera if corrupted. Therefore, even if data corruption caused by the drain disturb occurred, it would not cause a fatal failure. In addition, in the embodiment, the round-robin data recording is implemented as described in detail below in order to minimize the difference in the number of rewrites between blocks. This provides a configuration with which the drain disturb is relatively less likely to occur.

Figure 4:
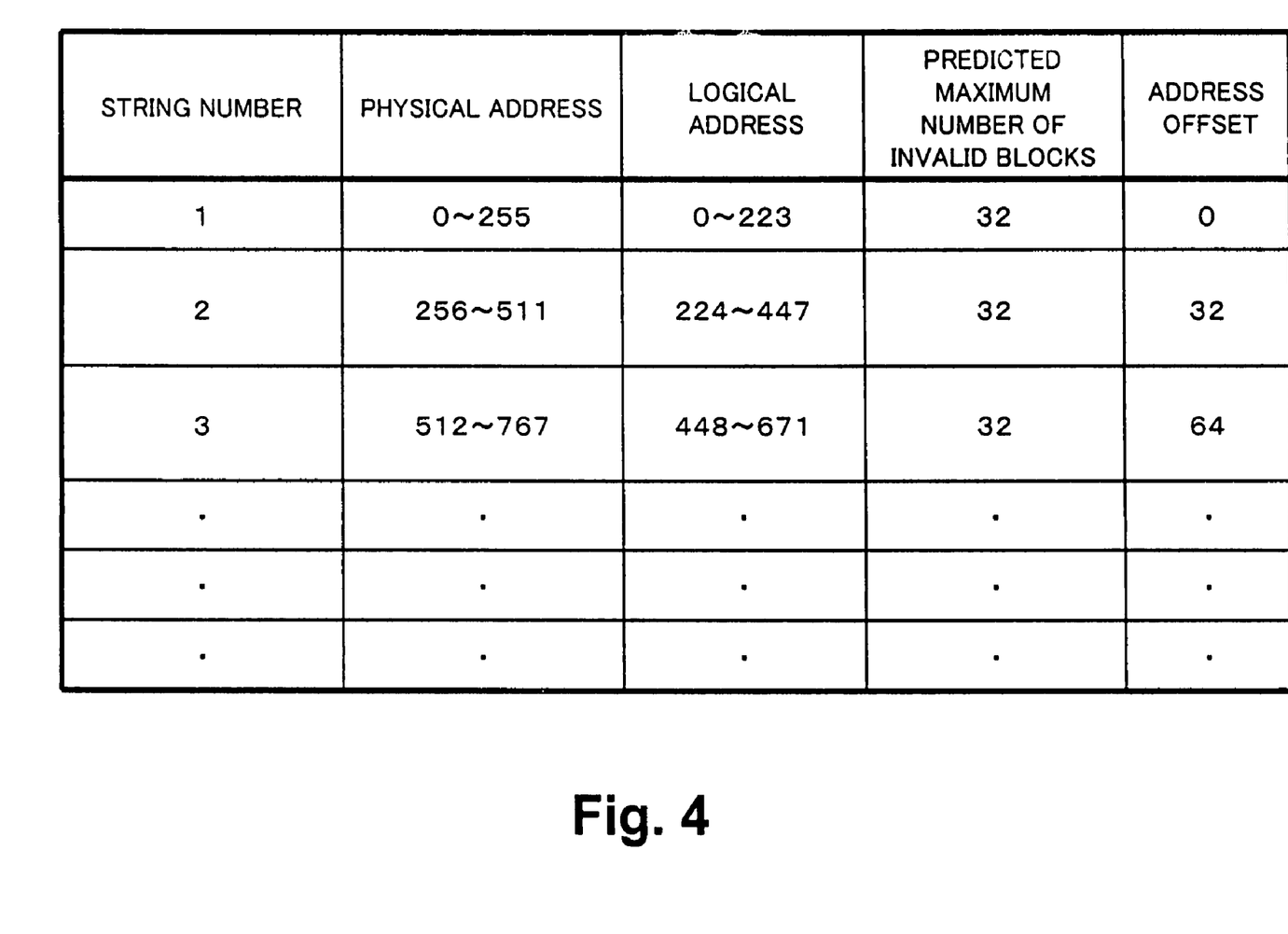
FIG. 4 is a table showing the number of physical and logical addresses corresponding to each string.

A management aspect of addresses in the driver device according to an embodiment will now be described with reference to FIG. 4. FIG. 4 is a table showing a relationship between a physical address, which is assigned to a block constituting each string, and a logical address.

As previously discussed, a single string consists of 256 blocks, and each block has a physical address assigned thereto from the start in ascending order. Therefore, the physical address 0 is assigned to the start block of the string 1, and the physical address 256 is assigned to the start block of the string 2. In other words, a single string has 256 physical addresses assigned thereto.

On the other hand, the number of logical addresses corresponding to a single string is different from that of physical addresses (the number of blocks). This is because a predicted maximum number of invalid blocks is taken into account. The invalid blocks are those blocks that are invalid or unusable due to damage and the like. Although it is desirable that there be no such invalid block, more than one invalid, block is actually present in a single string.

If physical addresses and logical addresses of the same number are assigned to a string without considering the number of the invalid blocks, there will be a balance of logical addresses as much as the invalid blocks. In the embodiment, therefore, the predicted maximum number of invalid blocks is taken into account before logical addresses are assigned. Specifically, the number of logical addresses corresponding to a single string is determined as the number of blocks constituting the string less the number of invalid blocks. For example, given 32 invalid blocks in the string 1, logical addresses to be assigned to the string 1 would be 0 to 223, or 224 logical addresses.

In addition, the value of the starting logical address of a string is determined by offsetting the value of the starting physical address of the string by the total number of invalid blocks in the strings previous to the string of interest. For example, the starting logical address of the string 3 is 448 which is determined by offsetting the starting physical address, 512, of the string 3 by the total number of invalid blocks in the strings previous to the string 3, or the strings 1 and 2, i.e. 32+32=64. The total number of invalid blocks in the strings previous to the string of interest will thereafter be referred to as an address offset. In this way, setting the starting logical address of each string based on the address offset provides crammed, continuous logical addresses over the flash memory. Consequently, address management in the high-level control device may be simplified.

Invalid blocks may be generated over time, and the number thereof may be not fixed. In the embodiment, therefore, the maximum number of possible invalid blocks in each string is predicted, and then logical addresses are assigned taking the predicted maximum number of invalid blocks into account.

Figure 5:
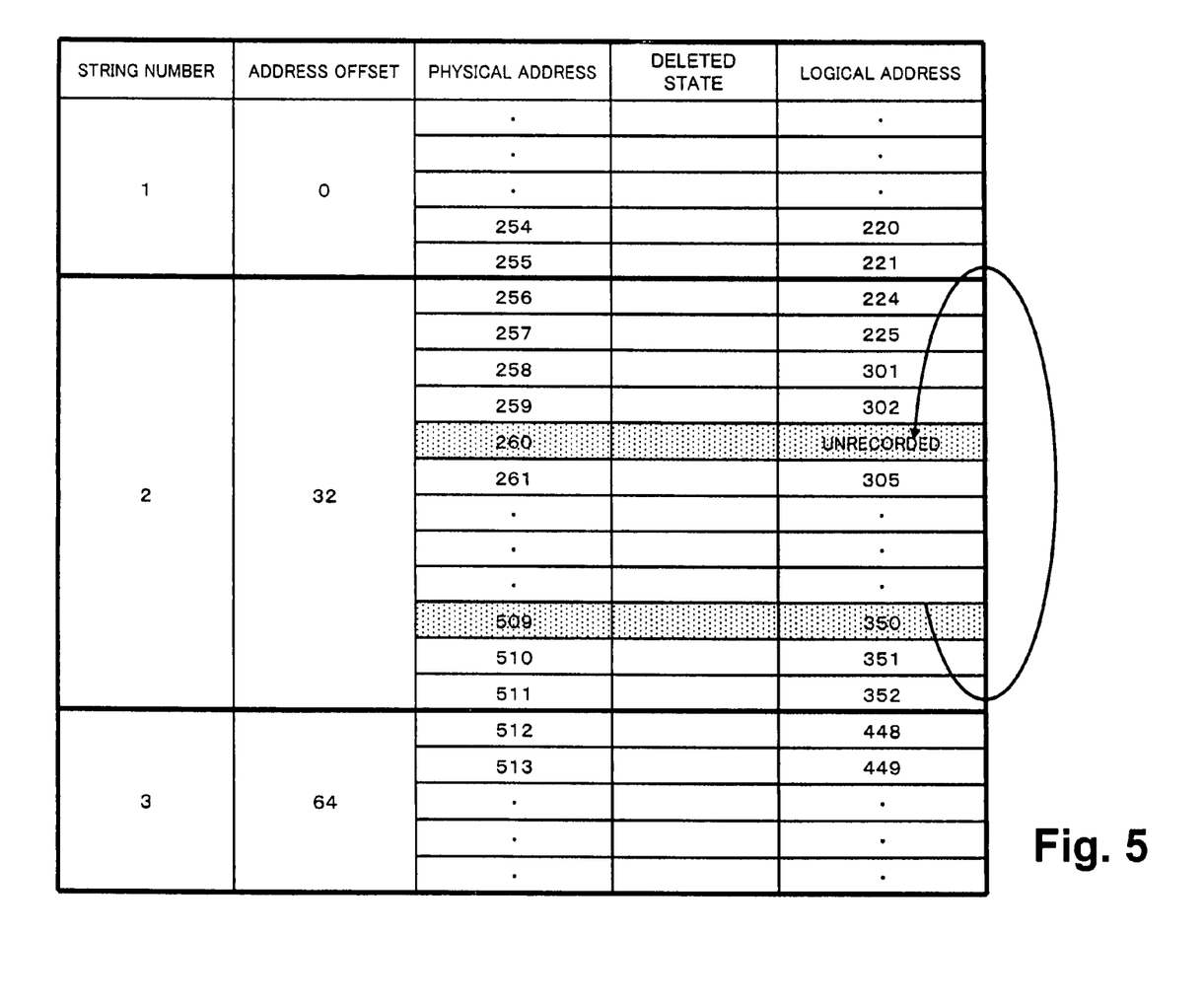
FIG. 5 is a table showing a correlation information between a physical address and a logical address, as well as a deleted state of each block.
Figure 6:
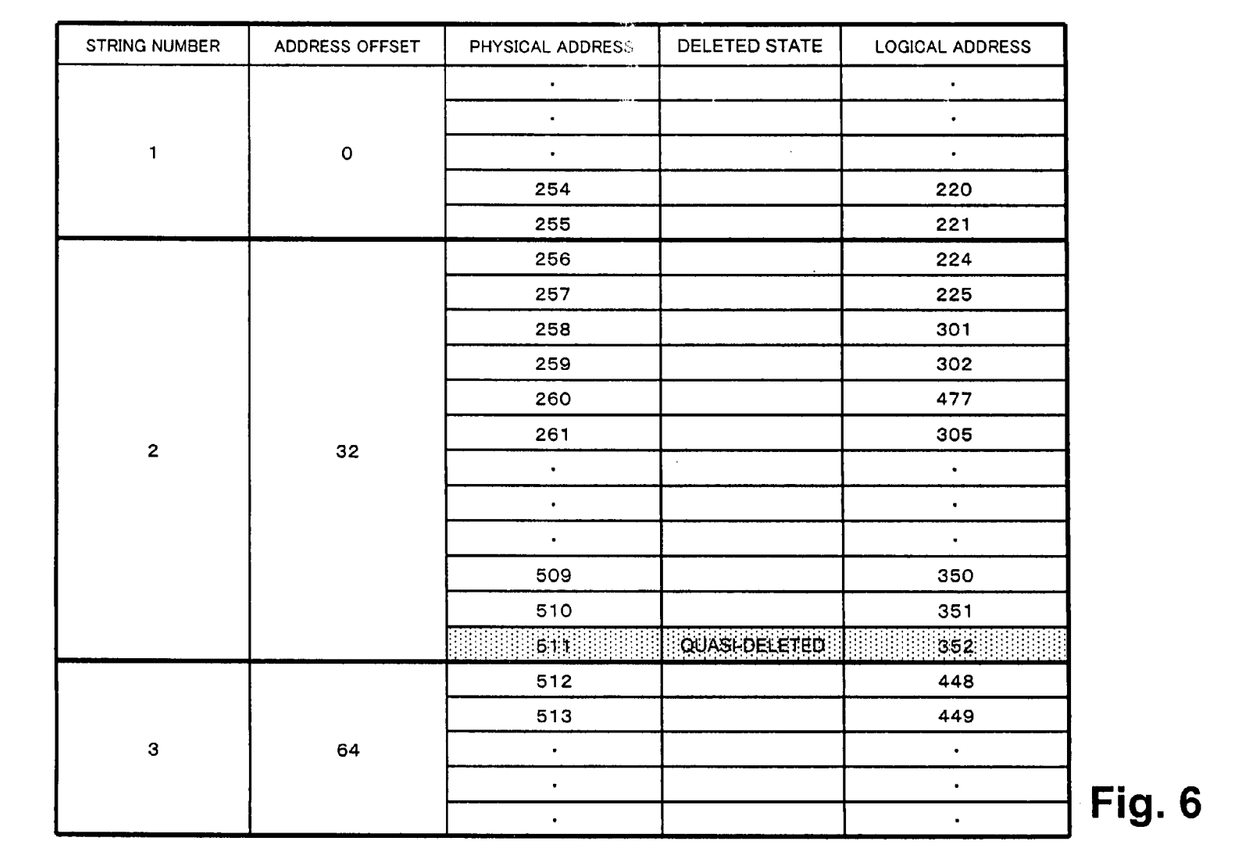
FIG. 6 is a table showing a correlation information between a physical address and a logical address, as well as a deleted state of each block.
Figure 7:
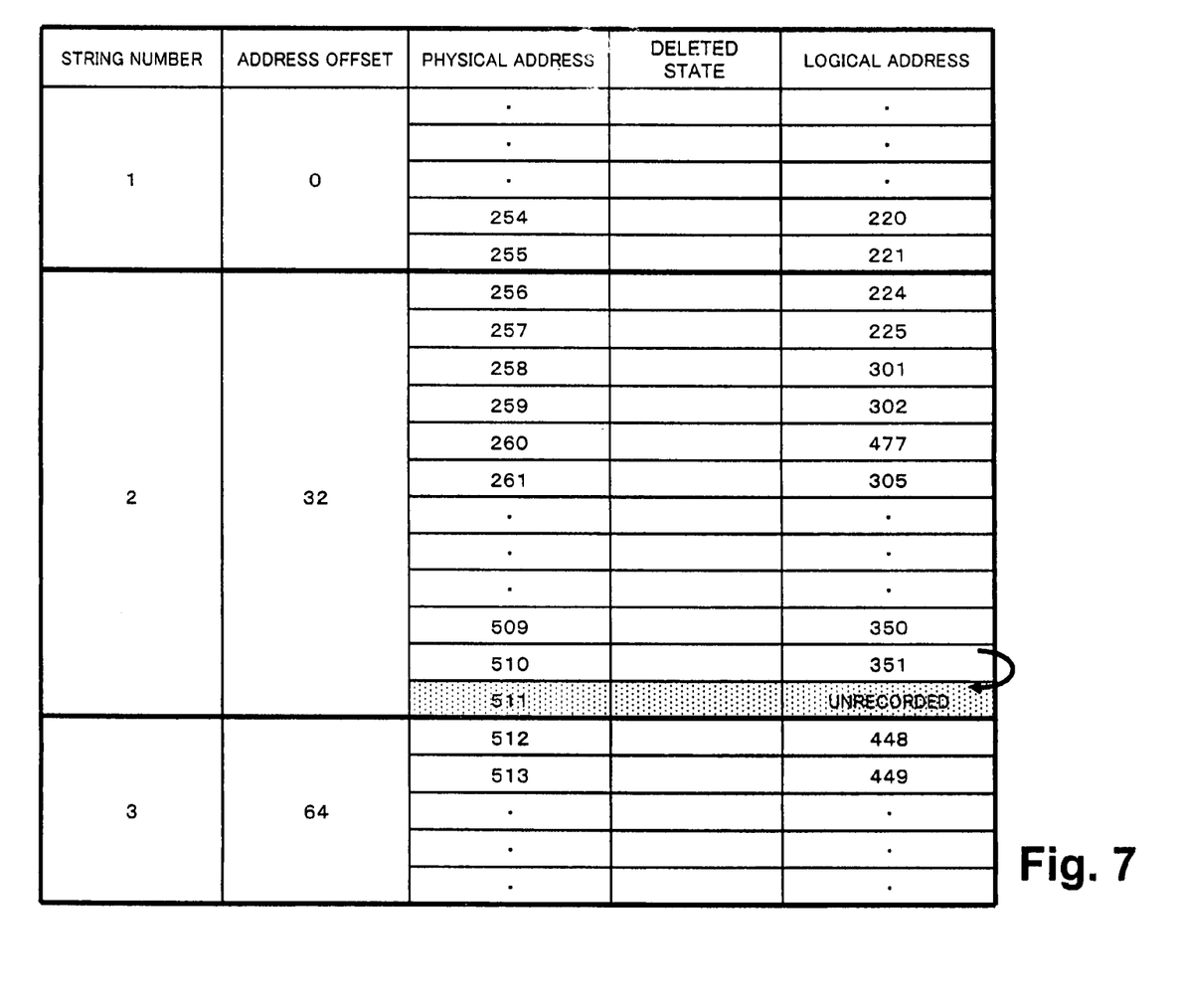
FIG. 7 is a table showing a correlation information between a physical address and a logical address, as well as a deleted state of each block.

How rewritable data is read and written according to an embodiment will now be described with reference to FIGS. 5 to 7. FIGS. 5 to 7 are tables showing a correlation information between a physical address and a logical address, as well as a deleted state of each block. In FIGS. 5 to 7, blocks with a logical address number are recorded blocks in which data has physically been recorded, while blocks without a logical address assigned, and labeled as unrecorded blocks, are available blocks in which data has not been recorded. The block with a label "quasi-deleted" in its deleted state is the block in which the data is logically deleted but not physically deleted.

The driver device 12 according to the embodiment records data in so-called round-robin fashion when the file system device 14 instructs recording of data. Specifically, the driver device 12 sequentially searches for the unrecorded block from the physical address corresponding to the logical address specified by the file system device 14, and records the data in the first discovered unrecorded block. After the data is recorded, the driver device 12 associates the physical address of the block in which the data has been recorded with the specified logical address, and records them in the RAM 20. If an unrecorded block is not discovered to the end of the string, the search returns to the start of the string, and again the device sequentially searches for the unrecorded block. When instructed to delete data, the data in the instructed block is not actually deleted, and the block is put in a quasi-deleted state. The quasi-deleted block will be handled as a recorded block in search of an unrecorded block. When all the blocks in the string are in either recorded or quasi-deleted data states data, and an unrecorded block is not discovered, the data in the quasi-deleted state is actually deleted to form an unrecorded block. Subsequently, an unrecorded block is again searched for to record data.

For example, consider the case where the file system device 14 instructs recording of data to the logical address 477. In this case, the driver device 12 sequentially searches for the presence of an unrecorded block from the physical address corresponding to the logical address 477. Here, the physical address corresponding to the logical address 477 has a value of the logical address 477 plus an address offset as previously discussed. The logical address 477 is present in the string 2 and the address offset at the string 2 is 32. Therefore, the physical address corresponding to the logical address 477 is 509 which is determined by adding 32 to the logical address 477. Therefore, the driver device 12 sequentially searches for an unrecorded block from the physical address 509.

If the physical address 509 is found unrecorded, the data is recorded to the physical address 509, and the physical address 509 and the logical address 477 are associated with each other and recorded in the RAM 20. However, if the physical address 509 is found recorded, the recorded status of the next physical address 510 is looked through to search for an unrecorded block. If no unrecorded block has been discovered to the end physical address of the string, an unrecorded block is searched for sequentially from the starting physical address of the string. If an unrecorded block is discovered, then the data is recorded in the block, and the physical address and the logical address of the block are associated with each other and recorded in the RAM 20.

In the example in FIG. 5, there is no unrecorded block from the physical address 509 to the physical address at the end of the string. Therefore, the driver device 12 sequentially searches for an unrecorded block from the physical address 256 at the start of the string. The device then records the data to the physical address 260, or the first discovered unrecorded block, and associates the physical address 260 with the logical address 477 and records them in the RAM 20.

Now consider the case where the file system device 14 instructs deleting of data at the logical address 352. In this case, the driver device 12 refers to the records in the RAM 20 to obtain the physical address value corresponding to the logical address 352, and puts the block having the physical address assigned thereto in the quasi-deleted state. Specifically, as shown in FIG. 6, the block at the physical address 511 corresponding to the logical address 352 is put in the quasi-deleted state. The fact that the physical address 511 (logical address 352) is in the quasi-deleted state is then stored in the RAM 20.

In the context in FIG. 6, consider the case where the file system device 14 further instructs recording of data to the logical address 478. In this case, an unrecorded block is sequentially searched for from the physical address 510 corresponding to the logical address 478. At this time, the physical address 511 is in the quasi-deleted state in which the data is logically deleted while it is physically left. Therefore, the driver device 12 handles the physical address 511 as a recorded block, and continues to search for a further unrecorded block. If all the blocks in the string have been searched to discover no unrecorded block, the data in the block in the quasi-deleted state is actually deleted. Specifically, if no unrecorded block has been discovered, the driver device 12 refers to the records in the RAM 20 to obtain the physical addresses of all quasi-deleted blocks in the string. The data is physically deleted for all quasi-deleted blocks based on the obtained physical addresses to form unrecorded blocks. In the context in FIG. 6, the quasi-deleted block is at the physical address 511. Therefore, the data in the block at the physical address 511 is actually deleted, and the resultant state is shown in FIG. 7. After the data is deleted, the driver device 12 updates the correlation information between a physical address, a logical address and a deleted state recorded in the RAM. In this state, the search is again started for an unrecorded block sequentially from the physical address 510. In this case, because the physical address 511 is an unrecorded block, the data is recorded therein. In addition, the logical address 478 and the physical address 511 are associated with each other and recorded in the RAM 20.

As is apparent from the above description, in the embodiments, an unrecorded block is searched for sequentially from the physical address corresponding to the logical address specified by the file system device 14. In the block data is instructed to be deleted from, the data is not immediately deleted, and the block is put in a quasi-deleted state. Therefore, it is less likely that data will be repeatedly physically written and deleted many times for only particular blocks. Consequently, the difference in the number of rewrites of data between blocks decreases. Eventually, data corruption caused by the drain disturb may be reduced.

As described above, according to the embodiments, coexistence of RW data and RO data in a single string is avoided. Consequently, corruption of RO data caused by the drain disturb can be prevented, and important RO data can be more reliably protected. In addition, blocks are distributed to store RW data so that the difference in the number of rewrites decreases in a single string. As a result, the occurrence of the drain disturb may be reduced in the string where RW data is stored, so that corruption of RW data can be reduced.

The invention has been described in detail with particular reference to certain preferred embodiments thereof, but it will be understood that variations and modifications can be effected within the spirit and scope of the invention.

PARTS LIST 1 partition (string 1)
1 flash memory
2 partition (strings 2 and 3)
2 flash memory
3 partition (strings 3 and 4)
4 partition
5 partition
6 partition
7 partition
255 block
260 physical address 352 logical address
448 starting logical address
477 logical address
478 logical address
509 physical address
510 physical address
511 physical address
512 starting physical address

The invention claimed is:

1. An accessing device which controls reading and writing operations of data from and to a flash memory which is divided into a plurality of strings having physically independent charge controls, the accessing device comprising:
 a high-level management device which manages a logical memory space by dividing the logical memory space into a plurality of partitions in which a write permission type is set at read-only or rewritable; and
 a low-level management device which maintains a correlation information between a physical memory space configuration and a logical memory space configuration and which reads and writes data from and to a flash memory based on the correlation information when the high-level management device instructs reading or writing of data from or to the flash memory, wherein
 the low-level management device specifies a permission type to write the data in a string by mapping one or multiple strings to a single partition.

2. The accessing device according to claim 1, wherein as a correlation information between the strings and the partitions, the low-level management device maintains a correlation information between a physical address assigned to each of a plurality of blocks which physically constitute each string and a logical address assigned to each of a plurality of clusters which logically constitute each partition.

3. The accessing device according to claim 2, wherein if a predicted maximum number of invalid blocks included in each string is known, a plurality of logical addresses are associated with a plurality of physical addresses assigned to each string up to the difference between the number of physical blocks constituting the string and the predicted maximum number of invalid blocks included in the string.

4. The accessing device according to claim 2, wherein when rewritable data is recorded in the flash memory, the low-level management device sequentially searches for an unrecorded block, in which data has not physically been recorded, in a string corresponding to a logical address where the high-level management device instructs recording of data, from an initial search position determined based on the instructed logical address, and the low-level management device records the data in a first discovered unrecorded block.

5. The accessing device according to claim 4, wherein if an unrecorded block is not discovered by the end of the string in search of the unrecorded block, the low-level management device sequentially searches for the unrecorded block from the start of the string.

6. The accessing device according to claim 4, wherein when the high-level management device instructs deleting of data, the low-level management device puts a block corresponding to a specified logical address in a quasi-deleted state in which the data is logically deleted but not physically deleted.

7. The accessing device according to claim 6, wherein if an unrecorded block is not discovered in search for the unrecorded block, the low-level management device physically deletes the data in the block in the quasi-deleted state to form an unrecorded block.

* * * * *